April 24, 1945.   J. G. INGRES   2,374,545
HYDRAULIC BRAKE OPERATING MECHANISM
Filed June 23, 1942
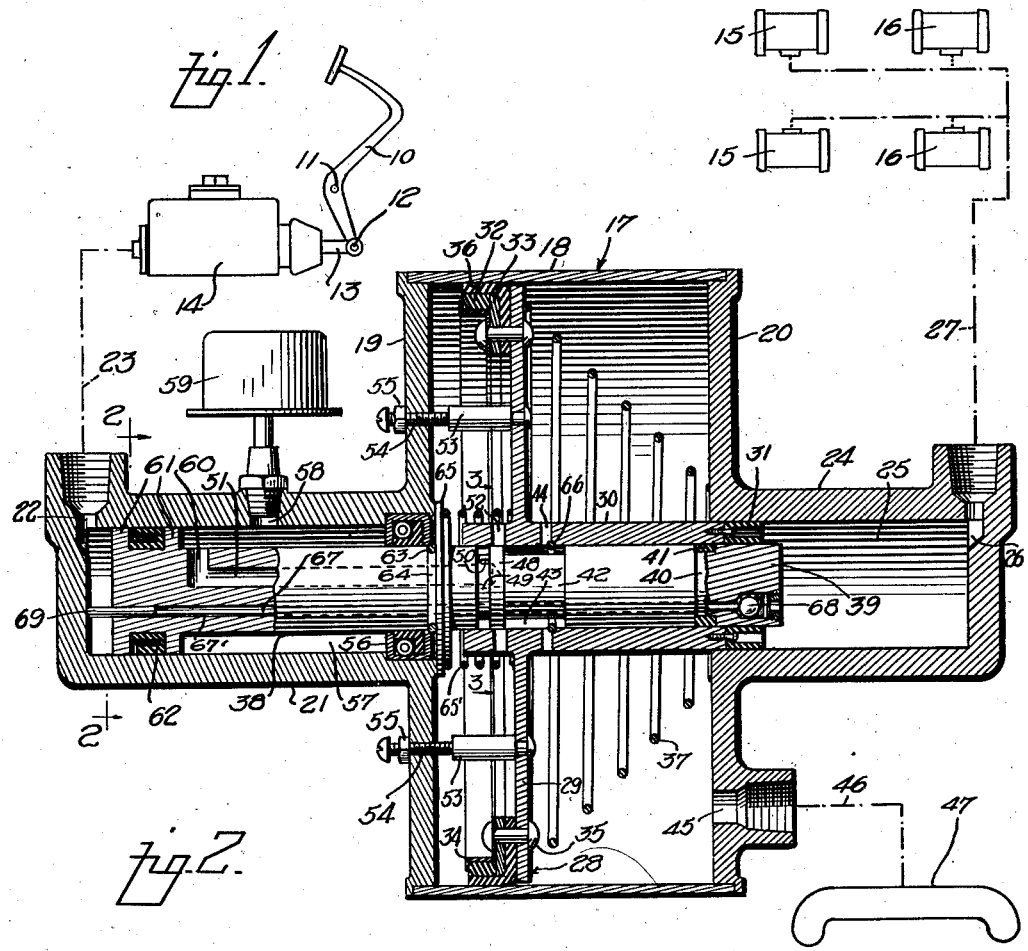
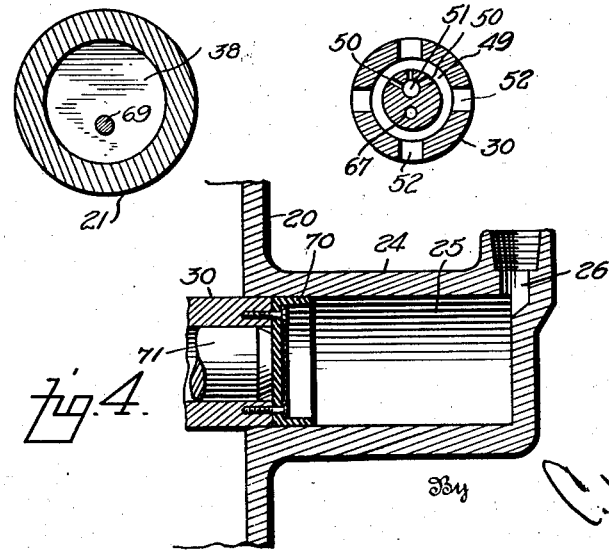
Inventor
JEANNOT G. INGRES
By
Attorney Patented Apr. 24, 1945

2,374,545

UNITED STATES PATENT OFFICE 2,374,545

HYDRAULIC BRAKE OPERATING MECHANISM

Jeannot G. Ingres, Detroit, Mich., assignor to Automatic Shifters, Inc., Richmond, Va., a corporation of Virginia Application June 23, 1942, Serial No. 448,110

3 Claims. (Cl. 60—54.5)

This invention relates to brake operating mechanisms, and more particularly to a combined manual and power operating mechanism for the hydraulic brakes of motor vehicles.

Numerous devices have been provided for utilizing movement of a vehicle brake pedal to energize a motor to supply the force necessary to apply the brakes, and many of these mechanisms are of the booster type wherein a part of the force is applied manually through the foot of the operator and in proportion to the power supplied by the power device. Many of these devices are highly advantageous in operation but until recently most of them relied upon the use of links, levers, rods, etc., in the system, which frequently raised serious problems of installation due to the lack of space in a motor vehicle chassis.

In recent years improvements on mechanisms of the type referred to have been developed wherein the manual or foot power and the power for operating the valve mechanism for energizing the motor has been delivered in the form of hydraulic pressure from the master cylinder of the vehicle brake. Such arrangement permits the use of pipes which eliminated problems inherent in the mechanical connection of the parts by levers, etc. This arrangement also greatly reduced the cost of manufacture of the mechanisms. The power devices or brakes of this type are connected to the brake cylinders of the wheels by pipe connections which also involve no installation problem since the pipes can be bent as desired. Therefore, it was wholly possible to mount the power device as a unit wherever desired, regardless of its location relative to the brake pedal or to the brake cylinders of the wheels.

An important object of the present invention is to provide a novel form of power brake mechanism which involves all of the advantages of the later types of mechanisms referred to but wherein the use of a substantial number of relatively small expensive parts is eliminated together with the labor involved in installing such parts.

A further object is to provide a power brake mechanism of the character referred to wherein the power device involves only two relatively movable units through which all of the advantages of the later types of mechanisms are obtained with an increased positiveness of operation and a greater degree of dependability due to the greatly reduced possibility of failure because of the use of a minimum number of parts.

A further object is to provide a mechanism of this character wherein the provision of a by-pass pipe around the motor for conveying brake fluid under foot pressure directly to the parts to take up slack therein prior to the functioning of the motor is eliminated, the present apparatus providing the same results without any by-pass or any similar fluid connection outside of the power device.

A further object is to provide such a device which is so constructed that initial pressure on the foot pedal tends to take up play between the brake shoes and the brake drums, followed by the energization of the motor to generate the force for applying the brakes, the parts being so constructed as to provide a fine accurate response of the motor in a follow-up action with respect to movement of the foot pedal.

A further object is to provide a novel brake construction wherein a predetermined portion of the work is performed by the power device and the remainder by the foot of the operator, and to provide a novel structure wherein exact "feel" is provided for the brake pedal without the use of pressure responsive diaphragms or the like.

Other objects and advantages of the invention will become apparent during the course of the following description.

In the drawing I have shown two embodiments of the invention. In this showing—

Figure 1 is a central longitudinal sectional view through the motor unit, the brake pedal, master cylinder, the brake cylinders of the wheels and the several pipe connections being diagrammatically represented in connection therewith, Figure 2 is a detail sectional view on line 2—2 of Figure 1, Figure 3 is a detail fragmentary sectional view on line 3—3 of Figure 1, and Figure 4 is a fragmentary central longitudinal sectional view of the pressure chamber end of a motor showing a slight modification.

Referring to Figure 1, the numeral 10 designates a conventional vehicle brake pedal pivotally supported as at 11 and having its lower end connected as at 12 to the plunger rod 13 of a conventional master cylinder 14. The structure referred to forms no part per se of the present invention, and it will be apparent that the master cylinder 14 is provided with the means (not shown) commonly employed for replenishing fluid in the braking system as slight leakage takes place over a long period of time. The wheels of the vehicle are provided with conventional brake means (not shown) and conventional wheel cylinders are employed for receiving fluid under pressure to apply the brakes. In Figure 1, four of these cylinders are employed, one pair being designated by the numeral 15 and the other pair by the numeral 16. One pair of these cylinders is for the front vehicle wheels and the other for the rear wheels, but it will become apparent that the present system is fully operative regardless of the number of the vehicle wheels in connection with which hydraulic brakes are employed.

The motor unit embodying the present invention is indicated as a whole by the numeral 17. This unit comprises a cylinder 18 having heads 19 and 20 secured thereto in any conventional manner. The head 19 is provided with an integral axial tubular extension 21 the extremity of which is provided with an inlet port 22 through which fluid flows from the master cylinder 14 by means of a pipe line diagrammatically shown in Figure 1 and indicated by the numeral 23. The head 20 is also provided with an integral axial tubular extension 24 and the space within this extension constitutes a fluid pressure chamber 25, as will become apparent. Fluid displaced from this chamber under pressure flows through a port 26 in the extremity of the extension 24, and thence through pipe lines diagrammatically shown in Figure 1 and generally indicated by the numeral 27 to the several brake cylinders, suitable branch pipes providing for the distribution of the fluid to the brake cylinders.

A piston indicated as a whole by the numeral 28 is arranged in the cylinder 18. This piston comprises a rigid disk 29 which may be welded to or integral with a plunger sleeve 30 one end of which extends into the pressure chamber 25 as shown in Figure 1. Such end of the plunger sleeve 30 is provided with a double-lipped packing 31 for a purpose to be described. The peripheral portion of the disk 29 is provided with a leather or similar packing cup 32. A flat ring 33 is arranged against the radial flange of the cup 32 and a retaining ring 34 has its radial flange arranged against the ring 33. Rivets or other fastening elements 35 secure the elements referred to together, and an expansion ring 36 is held in position by the retaining ring 34 to exert sufficient radial force against the annular portion of the packing ring 32 to maintain it in snug engagement with the cylinder 18. The piston as a whole is urged to its normal or inoperative position shown in Figure 1 by a suitable convolute spring 37.

A plunger indicated as a whole by the numeral 38 is slidable in the plunger 30. The plunger has one end 39 projecting slightly beyond the packing cup 31 into the pressure chamber 25 when the parts are in normal position. The inner lip of the cup 31 engages the projecting end of the plunger to seal it against leakage, and to further seal against leakage, the plunger 38 is provided with an annular groove 40 to receive suitable packing 41. The plunger is further provided with an annular groove 42 forming a space 43 in fixed communication with the right hand end of the cylinder 18 as viewed in Figure 1 through radial ports 44 in the plunger sleeve 30. Such end of the cylinder has its head 20 provided with a port 45 in constant communication through a pipe line diagrammatically indicated at 46, with the intake manifold 47 of the vehicle engine as a source of partial vacuum for operating the motor 17.

The left hand end of the groove 42 is defined by a land 48 adjacent which is an annular groove 49 (Figures 1 and 2) communicating through ports 50 with an air passage 51 which is always open to communication with the atmosphere in a manner to be described. To the left of the disk 29 as viewed in Figure 1 the plunger sleeve 30 is provided with radial ports 52. When the parts are in the "off" or normal position the right hand limit of the land 48 (Figure 1) is slightly to the left of the right hand limits of the ports 52, thus providing constant limited communication between the left hand end of the cylinder and the vacuum space provided by the groove 42. Thus the piston 28 will be vacuum suspended, a constant degree of vacuum existing on both sides of the piston. Upon movement of the plunger 38 to the right as viewed in Figure 1 communication between the ports 52 and groove 42 will be initially cut off, followed by the establishment of communication between the ports 52 and groove 49 to admit air into the left hand end of the cylinder 18.

It will be apparent that the spring 37 urges the piston 28 to the left in Figure 1 when pressures are balanced in the ends of the cylinder and means is provided for limiting the movement of the piston to the "off" position. The disk 29 may be provided with studs 53 engageable by stop screws 54 threaded through the head 19 and provided with jam nuts 55. Thus the piston as a whole will be limited in its movement to a position in which the piston will be vacuum suspended in the manner described.

The head 19 is provided with a packing assembly 56 which may be of any desired type and seals the space in the left hand end of the cylinder 18 from a space 57 surrounding a portion of the plunger 38 within the extension 21. The space 57 communicates with the atmosphere through a port 58 to which is connected a small air cleaner 59, and the plunger 38 has a radial port 60 connecting the passage 51 with the space 57. The left hand end of the plunger 38 as viewed in Figure 1 is provided with spaced flanges 61 between which is arranged a double-lipped packing ring 62 to seal the space 57 from the interior of the extreme left end of the extension 21 in which pressure is developed upon the introduction of fluid through the port 22.

The plunger 38 is provided with a locking ring 63 arranged in a groove 64 formed in the plunger. An annular ring 65 surrounds the plunger in engagement with the locking ring 63 and is normally spaced from the adjacent end of the plunger tube 30 to provide for the necessary movement of the plunger 38 as a valve element and to provide lost motion which may be taken up to move the plunger tube 30 by foot pressure upon a failure of power in the motor. A compression spring 65' is arranged between the ring 65 and the piston structure to urge the valve plunger 38 toward "off" position, and engagement of the ring 65 with the cylinder head 19 limits movement of the plunger 68 in such direction.

Adjacent the ports 44 the interior of the plunger tube 30 is provided with a locking ring 66 engageable with the right hand extremity of the groove 42 to prevent excessive movement of the plunger 38 with respect to the plunger tube 30 and to assist in insuring movement of the piston unit toward the left upon deenergization of the motor 17 in the event there should be any slight tendency for the plunger tube 30 or packing cup 32 to stick.

The plunger 38 is provided with a fluid passage 67' extending from end to end thereof as shown in Figure 1. A rod 67 extends through this passage and has one end engageable with the end of the extension 21 to unseat a check valve 68 when the plunger 38 is at its extreme left hand limit of movement. An enlargement 69 has very slight clearance with the passage 67', for example .001 inch, for a purpose to be described. The passage 67' is solely for the purpose of replenishing fluid leaking from the pressure end of the system, that is, the brake cylinders 15 and 16, pipe connections 27 and pressure chamber 25.

In Figure 4 of the drawing a slightly modified form of the invention is shown in which all of the elements except the plunger and packing cup are the same as shown in the corresponding portions of Figure 1. Accordingly the elements which are the same have been indicated by the same reference characters. The plunger sleeve 30 in Figure 4 is provided with a cup shaped packing element 70 which extends entirely across the end of the plunger sleeve, closing the bore therethrough. Within the plunger sleeve 30 is arranged a plunger 71 which is identical with the plunger 38 except that it is not provided with the passage 67' and associated elements; it terminates at the end of the plunger 30 against the cup 70; and it is not provided with any packing corresponding to the packing 41 in Figure 1 since such packing is unnecessary, as will become apparent. The packing cup 70 is formed of rubber or similar deformable material so that movement of the plunger 71 to operate the valve elements is permitted and such movement initially deforms the portion of the cup 70 engaged by the plunger 71 to initially displace fluid from the pressure chamber 25.

The operation of the form of the mechanism shown in Figures 1 to 4 inclusive is as follows:

The parts normally occupy the positions shown in Figure 1 under which conditions the brakes are completely released. The ports 52 are in slight communication with the valve groove 42 and with the interior of the right hand end of the cylinder 18, and such end of the cylinder is always in communication with the source of vacuum through port 45 and pipe line 46. Accordingly the piston 28 will be vacuum suspended.

When the brakes are applied the initial depression of the pedal 10 will move the plunger rod 13 to displace brake fluid from the master cylinder 14 through pipe line 23 into the end of the extension 21. Thus pressure will be built up to move the plunger 38 toward the right as viewed in Figure 1. Initial movement of the plunger 38 accomplishes two results. In the first place such movement will move the end 39 of the plunger into the pressure chamber 25 to displace brake fluid therefrom through pipe connections 27 into the several brake cylinders 15 and 16, thus immediately at least partially taking up play between the conventional brake shoes and brake drums (not shown), particularly if the brake pedal is depressed at a rapid rate. In this connection it will be noted that while the motor 17 will be energized very quickly upon depression of the brake pedal, as described below, there is a sufficient time lag between brake pedal operation and motor energization to permit the displacement of fluid from the pressure chamber 25 to at least partially take up play between the brake shoes and brake drums.

In the second place initial movement of the plunger 38 moves the valve groove 42 completely out of communication with the ports 52 and then moves these ports slightly into communication with the valve groove 49. Air will then flow through the air cleaner and port 58 and into the space 57 and thence through port 60, passage 51, ports 50, groove 49 and ports 52 into the left hand end of the cylinder 18 as viewed in Figure 1. Differential pressure thus will be established in the motor 17 to move the piston 28 toward the right.

Under such conditions the piston will move against the tension of the spring 37 and the studs 53 will move out of contact with the stop screws 54. The spring 37 is tensioned only sufficiently to move the piston 28 and the elements connected thereto back to their normal positions when the brake is released. The movement of the piston 28 by the differential pressures established on opposite sides thereof moves the right hand end of the plunger sleeve 30 (Figure 1) into the pressure chamber 25 to displace brake fluid therefrom into the brake system to provide for power application of the brakes in addition to the forces exerted by the foot of the operator in moving the plunger 38 to move the end 39 thereof into the pressure chamber 25.

In other words, two elements displace fluid from the chamber 25, namely, the end 39 of the plunger 38 and the corresponding end of the plunger sleeve 30. Thus it will be apparent that part of the braking action is performed by the operator and part by the motor and the proportion of the total work performed by the operator will be determined by the relative areas of the plunger end 39 and the corresponding end of the plunger sleeve 30. In the illustrated embodiment of the invention, the area of the plunger end 39 is approximately 40 per cent. of the cross sectional area of the pressure chamber 25 and accordingly the operator will exert 40 per cent. of the total braking force. It will be obvious that proportionate work done by the operator is purely a matter of design.

The pressure built up in the chamber 25, and consequently in the braking system, reacts against the plunger end 39 to resist displacement of braking fluid from the master cylinder 14 by operation of the pedal 10. Thus it will be apparent that movement of the pedal will always be resisted to a degree proportional to the pressure in the chamber 25, and accordingly the brake pedal is provided with an accurate proportional feel under all conditions.

The valve mechanism illustrated provides a perfect follow-up action of the piston 28 with respect to movement of the pedal 10. Any movement imparted in the manner described to the plunger 38 will be accompanied by movement of the piston 28 to the same extent. When movement of the plunger 38 stops, the piston 28 will move only to the slight extent necessary for the land 48 to close communication between the air groove 49 and ports 52, whereupon movement of the piston will stop. Any slight additional movement of the piston 28 if it tends to overrun a proper position with respect to the plunger 38 will "crack" the ports 52 to the vacuum space 42, thus instantly reducing the differential pressures acting on the piston 28 and arresting movement thereof.

When the pedal 10 is released for movement toward "off" position, the springs of the wheel cylinders will displace brake fluid through the lines 27 into the chamber 25 and the plunger 38 will move toward the left in Figure 1 to displace fluid through port 22 back into the master cylinder 14. The valve land 48 will move to open the ports 52 to the vacuum groove 42 to exhaust air from the left end of the cylinder 18 whereupon the piston 28 will be moved by the spring 37 toward its "off" position. The previously described follow-up action will then be reversed, the piston 28 moving to an extent corresponding to movement of the plunger 38. If the brake pedal is rapidly entirely released, the locking ring 66 will be engaged by the right hand end of the groove 42 (Figure 1). This operation limits movement of the valve plunger with respect to the plunger tube 30 to prevent the body of the valve to the right of the groove 42 from closing the ports 44. Thus it is impossible to disconnect the right hand end of the cylinder 18 from the vacuum space 42.

Similiarly rapid depression of the pedal 10 will engage the ring 65 with the adjacent end of the sleeve 30 to prevent the air groove 49 from overrunning the ports 52. It is therefore impossible to operate the plunger 38 so rapidly as to prevent the admission of air from the groove 49 through the ports 52. In the event of a failure of power in the motor operation the plunger 38 will engage the ring 65 with the sleeve 30 to operate the latter manually as a unit with the plunger 38.

In the "off" position of the parts, movement of the piston 28 will be limited by the stop screws 54 while movement of the plunger 38 will be limited by engagement of the ring 65 against the cylinder head 19. In this connection it will be noted that upon the releasing of the brake the spring 37 urges the piston 28 toward the left as viewed in Figure 1 while the spring 65' acts against the ring 65 to urge the plunger 38 in the same direction. When the studs 53 contact with the screws 54 the plunger 38 will be approximately in the position necessary for the ring 65 to engage the cylinder head 19, the plunger being urged to the left by the spring 65'. When the plunger and piston reach their limits of movement referred to there is no pressure in the chamber 25 tending to urge the plunger 38 further to the left and accordingly the plunger will stop in the position shown in Figure 1. The adjustable screws 54 are provided so that the piston 28 may be stopped at the proper limit of movement to maintain slight communication between the ports 52 and vacuum space 43 so as to vacuum suspend the piston 28.

The passage 67', rod 67 and check valve 68 function to replenish fluid leaking from the pressure end of the system without having to provide means separate from the master cylinder for accomplishing this result. As is well known, the master cylinders of all hydraulic vehicle brake systems are so constructed as to replenish fluid leaking from the systems with which they are used. In the present device the plunger 38 and associated parts normally would prevent flow of brake fluid from the master cylinder into the pressure end of the system. The application of the brakes gradually results in a slight loss of fluid from the pressure end of the system and assuming that there is a slight loss at each application of the brakes, the return springs of the brakes will displace fluid from the brake cylinders 15 and 16 through pipe lines 27 into the chamber 26 when the brakes are released, but the leakage will prevent the brake return springs from returning the plunger 38 fully to its normal position. However, the spring 65' accomplishes this result and if leakage has occurred from the pressure end of the system the least inclement of movement of the plunger 38 will create a slight partial vacuum in the pressure end of the system. As the plunger approaches its "off" position the left hand end of the rod 67 will engage the end of the extension 21 to unseat the valve 68 and the slight reduction in pressure in the pressure end of the system will cause brake fluid to leak past the enlargement 69 of the rod 67, and thence through passage 67' around the valve 68 into the pressure chamber 25.

Thus the parts described function to automatically replace fluid leaking from the pressure end of the system without the necessity of providing a reservoir for such end of the system. As previously stated, the enlarged end 69 of the rod 67 has a very slight clearance in the passage 67', this clearance preferably being approximately .001 inch. This clearance is sufficient for the seepage of brake fluid through the passage 67' to replace leakage losses in the pressure end of the system. The head 69 is provided so that upon initial depression of the brake pedal there will be no appreciable rush of brake fluid through the passage 67'. Initial depression of the brake pedal practically instantaneously establishes the same pressure in the pressure end of the system as exists in the inlet end of the system between the master cylinder 14 and plunger 38 and of course no fluid will flow through the passage 67 when pressures are thus balanced. Moreover, immediately after initial movement of the plunger 38 the motor 17 will be energized and movement of the piston 28 will generate much greater pressure in the pressure end of the system in which case fluid obviously cannot flow through the passage 67' into the chamber 25. Very slight movement of the plunger 38 is necessary to release the enlargement 69 from the end of the projection 21 and permit the valve 68 to seat, thus preventing reverse leakage of fluid from the pressure end of the system through the passage 67'.

As a matter of fact, the extremely slight leakage of fluid around the head 69 upon initial depression of the brake pedal usually is sufficient to charge the pressure end of the system with a very slightly greater amount of brake fluid to compensate for the amount of leakage ordinarily occurring during the following application of the brakes. When this course, return movement of the plunger 38 to its "off" position will not be accompanied by any flow of fluid into the pressure chamber 25.

The operation of the form of the invention in Figure 4 is identical with that previously described except that initial manual displacement of fluid from the chamber 25 takes place by the flexing of the central portion of the cup 70 by the adjacent end of the plunger 71. This flexing can take place to an ample extent to provide for the operation of the valve elements, which are identical with that shown in Figure 1.

From the foregoing it will be apparent that the present apparatus eliminates all use of mechanical linkages, etc., thus permitting the power unit to be located at any available position with respect to the vehicle. The piston unit and plunger 38 comprise only two relatively movable units and movement of the plunger to initially displace fluid from the chamber 25 eliminates the necessity for any by-pass pipe communicating between the spaces at the ends of the plunger. The construction also eliminates the use of a substantial number of relatively small parts previously used in an apparatus of this general nature. The cost of manufacture and the cost of assembly are thus materially reduced and there is materially less chance of failure or derangement of parts because of the simplicity of the mechanism. In connection with the simplicity of the apparatus and the elimination of parts ordinarily employed to accomplish the same results, it will be noted that the present apparatus provides a brake pedal with highly accurate "feel" without the use of diaphragms and chambers therefor responsive to varying pressures for resisting movement of the brake pedal to provide it with "feel."

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A brake operating mechanism for a hydraulic vehicle brake system having hydraulic brake cylinders for the vehicle wheels and a pedal-controlled master cylinder, comprising a differential fluid pressure motor having a pressure movable unit therein, axial extensions projecting from each end of said motor, one of said extensions forming a pressure chamber communicating with the brake cylinders, a tubular plunger carried by said pressure movable unit and slidable into said pressure chamber, an inner plunger having one end slidable in said tubular plunger and its other end slidable in the other axial extension, said other axial extension communicating with the master cylinder whereby fluid displaced therefrom will move said inner plunger to reduce the capacity of said pressure chamber for displacing fluid therefrom, and a follow-up valve mechanism for said motor formed as parts of said plungers, said other axial extension having a port communicating with a source of pressure fluid and said inner plunger having a fluid passage communicating at one end with said port and at its other end with said valve mechanism whereby operation of the latter controls pressures in said motor.

2. A brake operating mechanism for a hydraulic vehicle brake system having hydraulic brake cylinders for the vehicle wheels and a pedal-controlled master cylinder, comprising a differential fluid pressure motor having a pressure movable unit therein, axial extensions projecting from each end of said motor, one of said extensions forming a pressure chamber communicating with the brake cylinders, a tubular plunger carried by said pressure movable unit and slidable into said pressure chamber, an inner plunger having one end slidable in said tubular plunger and its other end slidable in the other axial extension, said other axial extension having its extremity communicating with the master cylinder whereby fluid displaced therefrom will move said inner plunger to reduce the capacity of said pressure chamber thereby displacing fluid therefrom, one end of said motor being connected to a source of sub-atmospheric pressure, said inner plunger having an air passage through said other end thereof and said other axial extension being ported to communicate with said air passage, and a follow-up valve mechanism formed as parts of said plungers and adapted to assume normal relative positions disconnecting the other end of said motor from said air passage and connecting it to the first named end of said motor, said plungers being relatively movable to disconnect said other end of the motor from the first named end thereof and connect it to said air passage.

3. A brake operating mechanism for a hydraulic vehicle brake system having hydraulic brake cylinders for the vehicle wheels and a pedal-controlled master cylinder, comprising a differential fluid pressure motor having a pressure movable unit therein, axial extensions projecting from each end of said motor, one of said extensions forming a pressure chamber communicating with the brake cylinders, a tubular plunger carried by said pressure movable unit and slidable into said pressure chamber, an inner plunger having one end slidable in said tubular plunger and its other end slidable in the other axial extension, said other axial extension having its extremity communicating with the master cylinder whereby fluid displaced therefrom will move said inner plunger to reduce the capacity of said pressure chamber thereby displacing fluid therefrom, said other axial extension having a port therethrough, said port and one end of said motor being respectively connected to sources of different fluid pressures, said inner plunger having a fluid passage through said other end thereof communicating with said port, and a follow-up valve mechanism formed as parts of said plungers and adapted to assume normal positions disconnecting the other end of said motor from said fluid passage and connecting it to the first named end of said motor, said plungers being relatively movable to disconnect said other end of the motor from the first named end thereof and connect it to said fluid passage.

JEANNOT G. INGRES.